US006294606B1

(12) United States Patent
Chen et al.

(10) Patent No.: US 6,294,606 B1
(45) Date of Patent: Sep. 25, 2001

(54) NONIONIC SURFACTANT-FREE EMULSION POLYMERIZATION PROCESS

(75) Inventors: Allan K. Chen, Oakville (CA); Chieh-Min Cheng, Rochester, NY (US); Tie Hwee Ng; George Liebermann, both of Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,267

(22) Filed: Jan. 19, 2000

(51) Int. Cl.[7] .............................. C08K 3/20; G03G 9/087
(52) U.S. Cl. ............................................ 524/501; 430/137
(58) Field of Search .............................. 524/501; 430/137

(56) References Cited

U.S. PATENT DOCUMENTS 5,853,943 12/1998 Cheng et al. .

*Primary Examiner*—Kriellion A. Sanders
(74) *Attorney, Agent, or Firm*—Oliff & Berridge, PLC; Eugene O. Palazzo, Esq.

(57) ABSTRACT

A latex used for the preparation of toner particles by emulsion aggregation is prepared, using a controlled addition of anionic surfactants, without the use of a nonionic surfactant. Such a process comprises preparing an aqueous phase using a limited amount of anionic surfactant; preparing an emulsion of monomers in water with additional anionic surfactant and without a nonionic surfactant; adding a portion of the emulsion to the aqueous phase to initiate seed polymerization, in the presence of an initiator, to form seed polymer; and adding the remaining monomer emulsion to the composition to complete polymerization to form a latex polymer.

24 Claims, No Drawings

NONIONIC SURFACTANT-FREE EMULSION POLYMERIZATION PROCESS

BACKGROUND OF THE INVENTION

1. Field of Invention

The invention relates to a semi-continuous emulsion polymerization process and to a method for preparing toner particles wherein the latex is formed by emulsion polymerization with no nonionic surfactant present. The aforementioned toners are especially useful for imaging processes, especially xerographic processes, which usually require high toner transfer efficiency, such as those having a compact machine design or those that are designed to provide high quality colored images with excellent image resolution and signal-to-noise ratio, and image uniformity.

2. Description of Related Art

It is known in the art to form toners by aggregating a colorant with a latex polymer formed by batch or semi-continuous emulsion polymerization. For example, U.S. Pat. No. 5,853,943 (hereinafter "the 943 patent"), which is herein incorporated by reference, is directed to a semi-continuous emulsion polymerization process for preparing a latex by first forming a seed polymer. In particular, the 943 patent describes a process comprising:

(i) conducting a pre-reaction monomer emulsification which comprises emulsification of the polymerization reagents of monomers, chain transfer agent, a disulfonate surfactant or surfactants, and optionally, but preferably, an initiator, wherein the emulsification is accomplished at a low temperature of, for example, from about 5° C. to about 40° C.;

(ii) preparing a seed particle latex by aqueous emulsion polymerization of a mixture comprised of (a) part of the monomer emulsion, from about 0.5 to about 50 percent by weight, and preferably from about 3 to about 25 percent by weight, of the monomer emulsion prepared in (i), and (b) a free radical initiator, from about 0.5 to about 100 percent by weight, and preferably from about 3 to about 100 percent by weight, of the total initiator used to prepare the latex polymer at a temperature of from about 35° C. to about 125° C., wherein the reaction of the free radical initiator and monomer produces the seed latex comprised of latex resin wherein the particles are stabilized by surfactants;

(iii) heating and feed adding to the formed seed particles the remaining monomer emulsion, from about 50 to about 99.5 percent by weight, and preferably from about 75 to about 97 percent by weight, of the monomer emulsion prepared in (ii), and optionally a free radical initiator, from about 0 to about 99.5 percent by weight, and preferably from about 0 to about 97 percent by weight, of the total initiator used to prepare the latex polymer at a temperature from about 35° C. to about 125° C.; and (iv) retaining the above contents in the reactor at a temperature of from about 35° C. to about 125° C. for an effective time period to form the latex polymer, for example from about 0.5 to about 8 hours, and preferably from about 1.5 to about 6 hours, followed by cooling.

In addition, the 943 patent teaches forming the in situ seed by adding a major, for example, about 50% or more, specifically from about 50 to about 95%, of the sulfonated emulsifier/surfactant to the portion of monomers used for forming the seed polymer, which is, for example, from about 0.5 to about 50% by weight, and preferably from about 3 to about 25 percent by weight, of the total monomers used to prepare the copolymer resin.

In known emulsion polymerization processes, surfactants (that is, emulsifiers) are used to stabilize the emulsion during emulsion polymerization. The presence of good surfactants is important for stabilizing the emulsion polymerization process. Generally, the surfactants include both ionic and nonionic surfactants. However, the same surfactants that contribute advantage in the emulsion polymerization step can be detrimental to the functional properties or processing of the final toners. In particular, the presence of surfactants, particularly nonionic surfactants, can contribute to problems such as filter blinding, over-dispersed particles, persistent emulsion and/or, more importantly, undesirable final toner characteristics, such as sensitivity to relative humidity, low tribo charge, dielectric loss, aging and poor toner flow.

Current emulsion aggregation processes have a disadvantage in that tribo charge depends on environmental changes to a large extent. Tribo charge degradation is observed especially in an environment of high temperature and high humidity. The tribo charge of the emulsion aggregation toner particles at high relative humidity can generally be controlled by avoiding the presence of surfactants, particularly nonionic surfactants, on the particle surface. Another disadvantage is that the adhesive properties between the toner particles and the substrate is poor at high relative humidity owing to the presence of surfactants, particularly nonionic surfactants, on the particles.

As a result, surfactants used in emulsion aggregation emulsion polymerization processes should be removed from the particle by washing to obtain useful tribo electric properties. However, surfactants for emulsion polymerization, particularly nonionic surfactants, are known to form hydrogen-bonded complexes with carboxylic acids and are thus difficult to remove from the surface of acrylic acid-containing particles in particular. In addition, often the removal of these surfactants, particularly nonionic surfactants, from the emulsion aggregation particles is very tedious and resource consuming, since surfactant removal is an equilibrium process and requires acceleration in order to be cost-effective.

Although the 943 patent suggest that nonionic surfactants may only be optional in the process for forming a latex taught therein, nonionic surfactants are used in most of the specific embodiments taught in the 943 patent. In embodiments in which a nonionic surfactant is not used, a monomer emulsion is formed using about 33% by weight of the anionic surfactant. About 5% by weight of the monomer emulsion and an initiator solution are then added to an aqueous phase containing the remainder of the anionic surfactant (about 67% by weight) to form a seed polymer. Thereafter, the monomer emulsion is continuously fed to the aqueous phase over a period of over 4 hours and the polymerization is completed.

SUMMARY OF THE INVENTION

The present invention is directed to a method for preparing latex polymers by an emulsion polymerization process that avoids the use of nonionic surfactants and optimizes the use of anionic surfactants. The process provides for emulsion aggregation toners with good tribo charge stability, especially in an environment of high temperature and high humidity. In addition, because in embodiments there are no nonionic surfactants to remain with the latex particles, the toner tribo charge is not as influenced by environmental changes. Furthermore, the process of the present invention can provide for a nonionic surfactant-free emulsion with high solids loading, such as about 40 wt %.

The process of the present invention comprises forming an aqueous phase containing anionic surfactant in an amount less than 20% by weight of the total amount of anionic surfactant used in forming the latex polymer. In a preferred embodiment, the aqueous phase is nonionic-surfactant free. By minimizing the amount of anionic surfactant in the initial aqueous phase, toner with better electrical and particle size properties may be provided.

The process of the present invention further comprises preparing an emulsion of monomers in water separate from the above-mentioned aqueous phase. The monomer emulsion comprises anionic surfactant and is generally nonionic surfactant-free. To form the emulsion, monomer and anionic surfactant are generally added to water and agitated to form an emulsion. The monomer emulsion may also contain a free radical initiator.

After the monomer emulsion has been formed, a portion of no more than 25% by weight of the monomer emulsion and a free radical initiator is added to the aqueous phase and mixed to initiate seed polymerization at the desired reaction temperature. In this process, the initiator is a free radical initiator and may or may not be a free radical initiator that attaches to the seed polymer to form ionic, hydrophilic end groups on the polymer. The free radical initiator may be added separately before, during or at the same time as the monomer emulsion or as part of the monomer emulsion.

After forming seed particles, additional monomer from the monomer emulsion is added to the composition, and the polymerization is continued at a prescribed temperature for a desired period of time to complete polymerization thus forming a latex polymer. During this process, additional initiator may also be added. If added, this initiator is preferably a free radical initiator. It can, but need not, be a free radical initiator that attaches to the polymer to form ionic, hydrophilic end groups on the polymer.

After forming the latex polymer, the latex may then be aggregated with a colorants preferably in the form of a colorant dispersion, to form aggregate particles that are then coalesced or fused to form toner particles.

In forming the latex, there is preferably no nonionic surfactant added to the composition. However, nonionic surfactant may be present in or added to the colorant dispersion, although this is not recommended. As such, even if no nonionic surfactant is used in forming the latex polymer, nonionic surfactant may be present in the toner formed. However, the emulsion aggregation approach in which no nonionic surfactant is used in forming the latex polymer provides for toner with less surfactant. In particular, using the nonionic surfactant-free latexes in emulsion aggregation toner will generally enable at least 50% surfactant reduction since the bulk of the surfactant in typical toners comes from the latex rather than from the colorant dispersion and a substantial amount of the surfactant used in forming the latex is typically nonionic surfactant. Such emulsion aggregation toner particles require considerably less washing to achieve maximum tribo levels than is needed with nonionic surfactant-containing latexes, and their tribo levels are less sensitive to humidity and temperature variations.

DETAILED DESCRIPTION OF PREFERRED EMBODIMENTS

One or more monomers may be used to form a latex polymer in the present invention. Any suitable monomers may be used. Monomers particularly useful in the nonionic surfactant-free process of the present invention include, but are not limited to, acrylic and methacrylic esters, styrene, vinyl esters of aliphatic acids, ethylenically unsaturated carboxylic acids and known crosslinking agents. Suitable ethylenically unsaturated carboxylic acids can be acrylic acid, methacrylic acid, itaconic acid, maleic acid, fumaric acid, 2-carboxyethyl acrylate (βCEA), and the like. Preferably, more than one monomer is used. In particular, the monomers preferably include styrene, n-butyl acrylate and/or βCEA.

The latex polymer formed may or may not be crosslinked. Any suitable crosslinking agents may be used. Suitable crosslinking agents include, but are not limited to, divinyl benzene, divinyl toluene, diacrylates, dimethylacrylates, and the like.

The monomers are mixed with water and an anionic surfactant to form an emulsion. The emulsification is generally accomplished at a temperature of about 5° C. to about 40° C. However, the emulsion may also be formed at higher temperatures in particular. To form an emulsion, the mixture is generally agitated using an appropriate mixing device, such as a vessel with an agitator, having one or multiple impellers, a vessel containing a high speed agitator, such as a homogenizer, or a vessel equipped with an external loop containing an in-line mixing device. The mixing speed required to form an emulsion is determined by the type of device used. The time required to form an emulsion is generally less if the mixture is agitated at a higher speed.

The anionic surfactant used in forming the monomer emulsion may be any anionic surfactant that will provide the desired emulsification and latex, as well as would not affect negatively the toner functional properties. Anionic surfactants that may be used include, but are not limited to, diphenyloxide disulfonates, alkylbenzene sulfonates, alkyl naphthalene sulfonates and sulfates, and the like, or mixtures thereof. The preferred class of anionic surfactants are the diphenyloxide disulfonates, as it was found, in embodiments, that they offer the best combination of properties for the latex production, as well as for the toner preparation and properties. In a preferred embodiment of the invention, the surfactants used are commercially available diphenyloxide disulfonates, such as the DOWFAX series available from Dow Chemical. In another preferred embodiment of the invention, the amount of anionic surfactant in the monomer emulsion is more than 80% by weight, preferably more than 90% by weight, of the total amount of anionic surfactant used in forming the latex polymer. The total amount of anionic surfactant used in forming the latex polymer may be between 0.5 and 10% by weight, preferably between 1 and 4% by weight, of the total amount of monomer used in forming the latex polymer.

In addition, a chain transfer agent is preferably added to the monomer emulsion to control the molecular weight properties of the polymer to be formed. Chain transfer agents that may be used in the present invention include, but are not limited to, dodecanethiol, butanethiol, isooctyl-3-mercaptopropionate (IOMP), 2-methyl-5-t-butylthiophenol, carbon tetrachloride, carbon tetrabromide, and the like. Chain transfer agents may be used in any effective amount, such as from about 0.1 to about 10 percent by weight of the monomer in the monomer emulsion.

To form the seed polymer, a portion of the monomer emulsion is added to an aqueous phase. The aqueous phase contains no more than 20% by weight of the total amount of anionic surfactant used in forming the latex polymer.

Preferably, the aqueous phase contain from 0.5 to 10% by weight of the total amount of the anionic surfactant used in forming the latex polymer. In a further preferred embodiment, the aqueous phase contains less than 3% by weight anionic surfactant. Any anionic surfactant, including the ones listed above, may be included in the aqueous phase and the anionic surfactant in the aqueous phase may be the same or different from the anionic surfactant used in forming the monomer emulsion.

The portion of the monomer used to form the seed polymer is generally from about 0.25 to about 25 percent by weight of the total amount of monomer used to prepare the latex polymer. Preferably, the amount of monomer used to form the seed polymer is from about 0.5 to 10 percent by weight, more preferably from about 0.5 to 3 percent by weight, of the total amount of monomer used to form the latex polymer.

The polymerization initiator, optionally mixed with monomer emulsion, or added separately to the aqueous phase to form seed polymer is a free radical initiator and may or may not be a free radical initiator that attaches to the polymer forming ionic, hydrophilic end groups on the polymer. The presence of these ionic, hydrophilic end groups on the polymer may serve to stabilize the latex. The stability results from the electrostatic repulsion of the charged groups on a given latex particle with respect to those on the other particles. Suitable initiators include, but are not limited to, ammonium persulfate, potassium persulfate, sodium persulfate, ammonium persulfite, potassium persulfite, sodium persulfite, ammonium bisulfate, sodium bisulfate, 1,1'-azobis(1-methylbutyronitrile-3-sodium sulfonate), and 4,4'-azobis(4-cyanovaleric acid). Preferably, the initiator is a persulfate initiator such as ammonium persulfate, potassium persulfate, sodium persulfate and the like. The initiator is generally added as part of an initiator solution in water.

The amount of initiator used to form the latex polymer is generally from about 0.1 to about 10 percent by weight of the monomer to be polymerized. From 5 to 100 percent by weight, and preferably from 30 to 100 percent by weight, of the total amount of initiator to be used to prepare the latex polymer is added during the seed polymerization stage.

In forming the seed polymer, the emulsion polymerization is generally conducted at a temperature of from about 35° C. to about 150° C., preferably from about 50° to about 95° C. The initiator is generally added to the emulsion fairly slowly in order to maintain the stability of the system. For example, the initiator is preferably added over the course of at least 5 minutes, more preferably over the course of at least 10 minutes.

Additional monomer is then added to the seed polymer to complete the polymerization. The additional monomer may be in the form of a monomer emulsion. In embodiments, the additional monomer is the remainder of the monomer emulsion that was partially used in forming the seed polymer. The emulsion polymerization is generally conducted at a temperature of from about 35° C. to about 150° C., preferably from about 50° C. to about 95° C. The additional monomer is generally fed to the composition at an effective time period of, for example, 0.5 to 8 hours, preferably 2 to 6 hours.

In addition, additional initiator may or may not be added after the seed polymerization. If additional initiator is added during this phase of the reaction, it may or may not be of the same type as the initiator added to form the seed polymer. Initiators useful during this step of the process include, but are not limited to, the above-mentioned initiators as well as hydrogen peroxide, t-butyl hydroperoxide, cumene hydroperoxide, para-methane hydroperoxide, benzoyl peroxide, tert-butyl peroxide, cumyl peroxide, 2,2'-azobisisobutyronitrile, 2,2'-azobis(2-methyl-butyronitrile), 2,2'-azobis(2-amidinopropane)dihydrochloride, 2,2'-azobisisobutyl amide dihydrate, 2,2'-azobis[2-(2-imidazolin-2-yl)propane]dihydrochloride, and 2,2'-azobis [2-(5-methyl-2-imidazolin-2-yl)propane]dihydrochloride.

Illustrative examples of latex polymers that may be formed by the process of the present invention include, but are not limited to, known polymers such as poly(styrene-butadiene), poly(methyl methacrylate-butadiene), poly (ethyl methacrylate-butadiene), poly(propyl methacrylate-butadiene), poly(butyl methacrylate-butadiene), poly (methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly (propyl acrylate-isoprene), poly(butyl acrylate-isoprene), poly(styrene-butylacrylate), poly(styrene-butadiene), poly (styrene-isoprene), poly(styrene-butyl methacrylate), poly (styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), poly(styrene-butyl acrylate-2-carboxyethyl acrylate), poly (styrene-butadiene-2-carboxyethyl acrylate), poly(styrene-isoprene-2-carboxyethyl acrylate), poly(styrene-butyl methacrylate-2-carboxyethyl acrylate), poly(butyl methacrylate-butyl acrylate-2-carboxyethyl acrylate), poly (butyl methacrylate-2-carboxyethyl acrylate), poly(styrene-butyl acrylate-acrylonitrile-2-carboxyethyl acrylate), poly (acrylonitrile-butyl acrylate-2-carboxyethyl acrylate), branched/partially crosslinked copolymers of the above, and the like.

In embodiments, the present invention is directed to processes for the preparation of toner that comprise blending a colorant, preferably a colorant dispersion, more preferably containing a pigment, such as carbon black, phthalocyanine, quinacridone or RHODAMINE B.TM. type, with a latex polymer prepared as illustrated herein and optionally with a flocculant and/or charge additives and/or other additives; heating the resulting mixture at a temperature below the Tg of the latex polymer, preferably from about 25° C. to about 1° C. below the Tg of the latex polymer, for an effective length of time of, for example, 0.5 hour to about 2 hours, to form toner sized aggregates; subsequently heating the aggregate suspension at a temperature at or above the Tg of the latex polymer, for example from about 60° C. to about 120° C., to effect coalescence or fusion, thereby providing toner particles; and isolating the toner product, such as by filtration, thereafter optionally washing and drying the toner particles, such as in an oven, fluid bed dryer, freeze dryer, or spray dryer.

The latex polymer is generally present in the toner compositions in various effective amounts, such as from about 75 weight percent to about 98 weight percent of the toner, and the latex polymer size suitable for the processes of the present invention can be, for example, of from about 0.05 micron to about 1 micron in volume average diameter as measured by the Brookhaven nanosize particle analyzer. Other sizes and effective amounts of latex polymer may be selected in embodiments.

Colorants include pigments, dyes, and mixtures of pigments with dyes, and the like. The colorant is generally present in the toner in an effective amount of, for example, from about 1 to about 15 percent by weight of toner, and preferably in an amount of from about 3 to about 10 percent by weight of the toner.

Illustrative examples of colorants, such as pigments, that may be used in the processes of the present invention include, but are not limited to, carbon black, such as REGAL 330.RTM.; magnetites, such as Mobay magnetites MO8029.TM., MO8060.TM.; Columbian magnetites; MAPICO BLACKS.TM. and surface treated magnetites; Pfizer magnetites CB4799.TM., CB5300.TM., CB5600.TM., MCX6369.TM.; Bayer magnetites, BAYFERROX 8600.TM., 8610.TM.; Northern Pigments magnetites, NP-604.TM., NP-608.TM.; Magnox magnetites TMB-100.TM., or TMB-104.TM.; and the like. Colored pigments or dyes, including cyan, magenta, yellow, red, green, brown, blue and/or mixtures thereof, may also be used. Generally, cyan, magenta, or yellow pigments or dyes, or mixtures thereof, are used.

Specific examples of pigments include, but are not limited to, phthalocyanine HELIOGEN BLUE L6900.TM., D6840.TM., D7080.TM., D7020.TM., PYLAM OIL BLUE.TM., PYLAM OIL YELLOW.TM., PIGMENT BLUE 1.TM. available from Paul Uhlich & Company, Inc., PIGMENT VIOLET 1.TM., PIGMENT RED 48.TM., LEMON CHROME YELLOW DCC 1026.TM., E.D. TOLUIDINE RED.TM. and BON RED C.TM. available from Dominion Color Corporation, Ltd., Toronto, Ontario, NOVAPERM YELLOW FGL.TM., HOSTAPERM PINK E.TM. from Hoechst, and CINQUASIA MAGENTA.TM. available from E.I. DuPont de Nemours & Company, and the like. Examples of magentas include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as For on Yellow SEIGLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK.TM., and cyan components may also be selected as pigments with the process of the present invention.

Flocculants may be used in effective amounts of, for example, from about 0.01 percent to about 10 percent by weight of the toner. Flocculants that may be used include, but are not limited to, polyaluminum chloride (PAC), dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL.TM. and ALKAQUAT.TM. available from Alkaril Chemical Company, SANIZOL.TM. (benzalkonium chloride), available from Kao Chemicals, and the like.

Charge additives may also be used in suitable effective amounts of, for example, from 0.1 to 5 weight percent by weight of the toner. Suitable charge additives include, but are not limited to, alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Other additives that may be used include, but are not limited to, waxes, which may act as a releasing agent.

The following examples illustrate specific embodiments of the present invention. One skilled in the art will recognize that the appropriate reagents, component ratio/concentrations may be adjusted as necessary to achieve specific product characteristics. All parts and percentages are by weight unless otherwise indicated.

EXAMPLES

Example I

Nonionic Surfactant-Free Latex Synthesis With Controlled Anionic Surfactant Addition (1)

A nonionic surfactant-free latex comprising styrenein-butyl acrylate/βCEA copolymer of 77.5/22.5/3 composition is synthesized by a nonionic surfactant-free emulsion polymerization process using sodium tetrapropyl diphenyloxide disulfonate (DOWFAX2A1™) as an anionic surfactant, ammonium persulfate as an initiator, decanediol diacrylate (A-DOD™) as a crosslinker, and dodecanethiol as a charge control agent.

In a 300 gallon jacketed stainless steel reactor equipped with an agitator (two four pitched-blade impellers) set at 35 rpm, 387 kilograms of deionized water and 694 grams of DOWFAX 2A1 are charged while the temperature is raised to 75° C. A monomer emulsion is prepared in a separate 150 gallon vessel equipped with an agitator, by mixing a monomer mixture (315.70 kilograms of styrene, 91.66 kilograms of n-butyl acrylate, 12.21 kilograms of 2-carboxyethyl acrylate (βCEA), 1.426 kilograms of decanediol diacrylate (A-DOD), and a total of 6.95 kilograms of 1-dodecanethiol) with 193 kilograms of deionized water plus 7.982 kilograms of DOWFAX 2A1 at room temperature for 30 minutes. 6.278 kilograms of seed monomer emulsion are taken from the monomer emulsion kept under agitation and pumped into the reactor, which is kept at 75° C., under nitrogen purge. After 10 minutes, an initiator solution prepared from 6.11 kilograms of ammonium persulfate in 30.20 kilograms of deionized water is added over 20 minutes. Stirring is continued for an additional 20 minutes to allow seed particle formation. The remaining monomer emulsion is fed into the reactor over 180 minutes. At the conclusion of the monomer feed, the composition is post-heated at 75° C. for 180 minutes to complete the reaction, then cooled. The reaction system is deoxygenated by passing a stream of nitrogen through it during the reaction.

A latex containing 41.9 percent solids with an Mw of 35,000, an Mn of 10,400, and an onset Tg of 51.1° C. is obtained. The residual monomer (styrene and butyl acrylate) in the latex is less than 100 ppm for each monomer. This latex is very stable and practically sediment-free. No sediment is observed after the latex is allowed to stand for three months.

Example II

Nonionic Surfactant-Free Latex Synthesis With Controlled Anionic Surfactant Addition (2)

The procedure described in Example I is repeated, except the amount of DOWFAX 2A1 used in the preparation of the aqueous phase is 434 grams, and 8.242 kilograms in the preparation of the monomer emulsion, and the total amount of dodecantehiol used is 7.129 kg. The amount of seed monomer emulsion used is 6.3 kilograms.

A latex containing about 40 percent solids with an Mw of 39,200, an Mn of 10,700 and an onset Tg of 51.1° C. is obtained. This latex is very stable and almost sediment-free. No sediment is observed after the latex is allowed to stand for two months.

Comparative Example I

Latex Synthesis Using An Anionic Surfactant

A latex comprising a styrene/butyl acrylate/acrylic acid copolymer of 77/23/1.5 composition is synthesized by an emulsion polymerization process using an anionic surfactant system recommended for styrene/acrylic copolymers. The surfactant system is a proprietary anionic custom designed commercial product from Rhodia named ABEX 2010™, which contains 30% active solids.

In a 5 gallon jacketed stainless steel reactor equipped with an agitator (one four pitched-blade impeller) set at 100 rpm, 7.910 kilograms of deionized water and 427.14 grams of ABEX 2010 are charged while the temperature is raised to 80° C. A monomer emulsion is prepared in a separate 5 gallon vessel equipped with an agitator, by mixing a monomer mixture of 6577.96 grams of styrene, 1964.85 grams of n-butyl acrylate, 128.14 grams of acrylic acid, as well as 58.09 grams of A-DOD, and 59.8 grams of dodecanethiol, with 3638.6 grams of deionized water plus 427.14 grams ABEX 2010 at room temperature for 30 minutes. An initiator solution prepared from 128 grams of ammonium persulfate in 640.78 grams of deionized water is added to the aqueous phase in the reactor, under nitrogen purge, at 80° C. over 37 minutes. The monomer emulsion is fed into the reactor over 180 minutes while maintaining the reactor temperature at 80° C. At the conclusion of the monomer feed, the composition is post-heated at 80° C. for 120 minutes, then cooled. The reactor system is deoxygenated by passing a stream of nitrogen through it during the reaction.

A latex containing about 40 percent solids with an Mw of 75,700, an Mn of 14,300 and an onset Tg of 53.5° C. is obtained. The latex is very stable and practically sediment-free. No sediment is observed after the latex is allowed to stand for three months.

Comparative Example II

Latex Synthesis Using a Nonionic Surfactant and an Anionic Surfactant

A latex containing a nonionic and anionic surfactant comprising a styrene/butyl acrylate/acrylic acid copolymer of 80/20/1.5 composition is synthesized by an emulsion polymerization process using both an anionic and a nonionic surfactant. The anionic surfactant is a 20 percent active sodium dodecylbenzenesulfonate (NEOGEN RK™ from Kao) while the nonionic surfactant is a 70% active polyoxyethylene nonyl phenyl ether (ANTAROX CA89™ from Rhodia).

In a 300 gallon jacketed stainless steel reactor equipped with an agitator (two four pitched-blade impellers) set at 70 rpm, 495.4 kilograms of deionized water, 8.11 kilograms of NEOGEN RK and 7.75 kilograms of ANTAROX CA89 are charged at room temperature. 3.60 kilograms of ammonium persulfate, the initiator, is added to the aqueous phase in the reactor, under nitrogen purge. The organic phase, comprised of the monomers and chain control agents, is prepared in a 150 gallon vessel equipped with an agitator by mixing 288.9 kilograms of styrene, 72.2 kilograms of butyl acrylate, 5.40 kilograms of acrylic acid, 4.70 kilograms of dodecanethiol and 3.60 kilograms of carbon tetrabromide.

The organic phase is fed into the reactor over 20 minutes while maintaining the reactor at room temperature. At the conclusion of the organic phase monomer feed, the reactor is heated to the reaction temperature of 70° C. in a controlled fashion in 90 minutes, while maintaining the agitation at 70 rpm. The polymerization is continued for 95 minutes, after which the temperature is increased again and the composition is post-heated at 85° C. for 60 minutes, then cooled. The reactor system is deoxygenated by passing a stream of nitrogen through it during the reaction.

A latex containing about 42.5 percent solids with an Mw of 33,900, an Mn of 11,600 and an onset Tg of 58.1° C. is obtained. The residual monomer (styrene and butyl acrylate) in the latex is less than 100 ppm for each monomer. Sediment containing low Mw and low Tg polymer particles is observed upon standing for two days. The amount of sediment determined by centrifugation at 3000 G-force for 180 seconds is 4.0% of the total latex. The latex sediment is removed from the entire batch using a 14 inch diameter decanting centrifuge prior to future use in toner particle preparation.

Examples I and II illustrate the emulsion polymerization process as described in the present invention, using an anionic surfactant in which less than 20% of the surfactant is used in the preparation aqueous phase. Comparative Example I illustrates an emulsion polymerization process where more than 20% of the anionic surfactant system is used in the aqueous phase, while Comparative Example II illustrates an emulsion polymerization process using both an anionic and nonionic surfactant.

Toner particles of a nominal particle size of 5.5 microns are prepared from the latexes obtained in Example I and Comparative Examples I and II by Aggregation/Coalescence using the same conditions for aggregation, coalescence, washing and drying. The toner particles contain a nominal 6% carbon black and nominal 10% wax. The Aggregation/Coalescence procedure involves the homogenization of the latex with deionized water using a high sheer homogenizer, followed by addition of a 30% aqueous wax dispersion (Polyethylene P725 wax) and an aqueous carbon black dispersion (Regal 330 carbon black) and continuing the homogenization. To the homogenized latex/pigment/wax blend, a controlled amount of 10% solution of polyaluminum chloride and $HNO_3$ are added to cause flocculation. The creamy blend is heated in a reactor under agitation to 55–60° C. while particle growth is monitored. When the particle size reaches over 5.0 microns (volume average diameter), additional latex is added (28% of total) to form a shell. The pH of the slurry is adjusted to 5.5 using 1% NaOH and the reactor temperature is increased to 93–95° C. After 6 hours at this temperature, the mixture is cooled down, the pH adjusted to 10, the particles filtered off, washed repeatedly with deionized water by resluny washing and filtration, and dried.

The toner particle size (D50, volume average diameter) and particle size distribution (GSD volume and number) is measured on a Coulter Counter. The shape of the toner is shown to be spherical by electron scanning microscopy.

The developers are prepared using a 35 micron carrier with a ferrite core coated with a 1.25 weight percent polymethylmethacrylate coating containing carbon black.

The developers are conditioned at 28° C., 85% relative humidity (A zone) and 10° C. and 15% relative humidity (C zone) and charged by mixing for 2 minutes. The toner tribo charge is determined using a Charge Spectrograph (CSG) at 100V/cm and expressed as displacement, in mm from the zero dot position (zero field). The humidity and temperature sensitivity is reported as the ratio of tribo charge in the two zones (A/C).

As illustrated in Table I below, the toner particles obtained from the latex prepared according to the present invention (Example I) have a significantly higher tribo charge especially in the A zone (high humidity and high temperature) compared to the others, and, as a result, a much lower sensitivity of the tribo charge to variations of humidity and temperature as illustrated by the high (0.79) A/C ratio.

TABLE 1

| | Toner particles obtained from latexes | | |
|---|---|---|---|
| Latex (Example) | Example I | Comparative Example I | Comparative Example II |
| Particle size (D50) micron | 5.54 | 5.26 | 5.29 |
| Particle size distribution (volume) (GSDv) | 1.22 | 1.20 | 1.19 |
| Particle size distribution (number) (GSDn) | 1.25 | 1.21 | 1.20 |
| Tribo charge A zone (mm) | −12.2 | −3.7 | −1.2 |
| Tribo charge C zone (mm) | −16.2 | −11.8 | −4.2 |
| Tribo Charge Ratio A/C | 0.79 | 0.28 | 0.31 |

What is claimed is:

1. A process for preparing a latex polymer, comprising:

(i) preparing an aqueous phase containing anionic surfactant in an amount less than 20% by weight of the total amount of anionic surfactant used in forming the latex polymer;

(ii) preparing an emulsion of monomers in water with anionic surfactant;

(iii) adding a portion of said monomer emulsion to said aqueous phase to initiate seed polymerization to form seed polymer, said portion containing less than 25% by weight of the total amount of monomer used in forming the latex polymer, said aqueous phase further containing a free radical initiator during the formation of the seed polymer; and (iv) adding an additional amount of said monomer emulsion to the composition formed in (iii) to complete emulsion polymerization thus forming a latex polymer.

2. A process according to claim 1, wherein no nonionic surfactant is used in the preparation of the latex polymer.

3. A process according to claim 1, wherein the anionic surfactant is a diphenyloxide disulfonate.

4. A process according to claim 1, wherein said free radical initiator is added to the aqueous phase before, during or at the same time as said monomer emulsion.

5. A process according to claim 4, wherein said free radical initiator is part of the monomer emulsion when it is added to the aqueous phase.

6. A process according to claim 4, wherein said free radical initiator is added over the course of at least five minutes.

7. A process according to claim 1, wherein the free radical initiator contained in said aqueous phase during the seed polymerization is from 5 to 100 percent by weight of the total amount of initiator used to prepare the latex polymer.

8. A process according to claim 1, wherein said free radical initiator is a persulfate initiator.

9. A process according to claim 1, wherein said monomer emulsion further comprises a chain transfer agent.

10. A process according to claim 1, wherein said surfactant in (i) is less than 10% of the total amount of anionic surfactant used in forming the latex polymer.

11. A process according to claim 1, wherein the portion of the monomer emulsion added in (iii) is about 0.5 to 3% by weight of the monomer emulsion.

12. A process according to claim 11, wherein the rest on the monomer emulsion is added in (iv).

13. A process according to claim 1, wherein said monomers used to prepare an emulsion in (ii) comprise more than one kind of monomer.

14. A process according to claim 1, wherein said monomer emulsion in (ii) contains more than 80% by weight of the total amount of anionic surfactant used in forming the latex polymer.

15. A process for preparing toner, comprising:

(i) preparing an aqueous phase containing anionic surfactant in an amount less than 20% by weight of the total amount of anionic surfactant used in forming the latex polymer;

(ii) preparing an emulsion of monomers in water with anionic surfactant;

(iii) adding a portion of said monomer emulsion to said aqueous phase to initiate seed polymerization to form seed polymer, said portion containing less than 25% by weight of the total amount of monomer used in forming the latex polymer, said aqueous phase further containing a free radical initiator during the formation of the seed polymer;

(iv) adding an additional amount of said monomer emulsion to the composition formed in (iii) to complete emulsion polymerization thus forming a latex polymer;

(v) aggregating a colorant with the latex polymer; and (vi) coalescing or fusing the aggregates to form toner particles.

16. A process according to claim 15, wherein no nonionic surfactant is used in the preparation of the latex polymer of (iv).

17. A process according to claim 16, wherein no nonionic surfactant is used in the preparation of the toner.

18. A process according to claim 15, wherein the colorant is in a dispersion, which contains a surfactant.

19. A process according to claim 15, further comprising adding a flocculant to the latex polymer before the latex polymer is aggregated with the colorant.

20. A process according to claim 15, wherein said aggregates further comprises a wax.

21. A process according to claim 15, wherein said aggregates further comprise a charge control agent.

22. A process according to claim 15, wherein the colorant is a pigment.

23. A process according to claim 15, wherein the colorant is a dye.

24. A process according to claim 15, wherein said monomer emulsion in (ii) contains more than 80% by weight of the total amount of anionic surfactant used in forming the latex polymer.

* * * * *